United States Patent
Onozawa et al.

(10) Patent No.: US 8,247,935 B2
(45) Date of Patent: Aug. 21, 2012

(54) BRUSHLESS MOTOR STATOR WITH FITTING POSITION DETERMINING STRUCTURE OF CIRCUIT SUBSTRATE

(75) Inventors: Izumi Onozawa, Nagano (JP); Masashi Miyazawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 437 days.

(21) Appl. No.: 12/574,291

(22) Filed: Oct. 6, 2009

(65) Prior Publication Data

US 2010/0084950 A1    Apr. 8, 2010

(30) Foreign Application Priority Data

Oct. 6, 2008    (JP) .................................. 2008-260094

(51) Int. Cl.
*H02K 11/00*    (2006.01)
(52) U.S. Cl. ................. 310/68 B; 310/156.05; 310/215; 310/71
(58) Field of Classification Search ................ 310/68 B, 310/156.05, 156.06, 215, 71
See application file for complete search history.

(56) References Cited

U.S. PATENT DOCUMENTS

| | | | |
|---|---|---|---|
| 4,540,906 A | * | 9/1985 | Blom .......................... 310/67 R |
| 4,934,041 A | * | 6/1990 | Hoover et al. ................... 29/596 |
| 6,654,213 B2 | * | 11/2003 | Horng et al. .................... 361/23 |
| 7,508,102 B2 | * | 3/2009 | Sugiyama et al. .......... 310/67 R |
| 2005/0046284 A1 | | 3/2005 | Kudo et al. |
| 2006/0012261 A1 | * | 1/2006 | Ku et al. ........................ 310/215 |
| 2008/0054735 A1 | * | 3/2008 | Yoshida et al. ................. 310/43 |
| 2010/0084950 A1 | * | 4/2010 | Onozawa et al. ........... 310/68 B |

FOREIGN PATENT DOCUMENTS

| | | | |
|---|---|---|---|
| JP | 02262864 | * | 10/1990 |
| JP | 03112351 | * | 5/1991 |
| JP | 10336941 | * | 12/1998 |
| JP | 2005-073378 | | 3/2005 |

* cited by examiner

*Primary Examiner* — Karl Tamai
(74) *Attorney, Agent, or Firm* — Rankin, Hill & Clark LLP

(57) ABSTRACT

A brushless motor stator is provided that may be applied to a plurality of types of motors having different rotational speeds, merely by providing one type of a circuit substrate. A pair of fitting convex portions that project radially outside of a virtual circle centering on a center line C are formed on one insulator divided body of a slot insulator. Three pairs of diagonally located fitting concave portions are formed in an inner circumferential wall portion surrounding a through-hole of a circuit substrate. The pair of fitting convex portions of the one insulator divided body are fitted in one of the three pairs of fitting concave portions. With this, a positional relationship between three hall elements and stator magnetic poles is selected, corresponding to the speed range of a motor to be used.

8 Claims, 8 Drawing Sheets

BRUSHLESS MOTOR STATOR WITH FITTING POSITION DETERMINING STRUCTURE OF CIRCUIT SUBSTRATE

TECHNICAL FIELD

The present invention relates to a brushless motor stator.

BACKGROUND ART

Japanese Patent Application Publication No. 2005-73378 (JP2005-073378A) discloses a brushless motor stator that comprises a stator core including a plurality of stator magnetic poles, a plurality of winding portions formed by winding winding conductors around the stator magnetic poles, a slot insulator made of an insulating resin, and a circuit substrate including at least one hall element that detects a positional relationship between rotor magnetic poles and the stator magnetic poles. The slot insulator electrically insulates the stator core and the winding portions. The stator is disposed so that the stator magnetic poles are located at predetermined intervals around a center line that coincides with a center of rotation of a rotor including the rotor magnetic poles. The circuit substrate is positioned at one end portion of the slot insulator through a fitting position determining structure. The one end portion of the slot insulator is located in one direction where the center line extends.

In the stator of this type as disclosed in JP2005-073378A, a desired position of at least one hall element relative to the stator core differs according to the speed range of a motor to be used. Traditionally, if stators are manufactured by using a slot insulator and a circuit substrate of such specifications as those mentioned above, it is necessary to provide a plurality of types of circuit substrates having different arrangement positions of the hall element according to the speed range of a motor to be used.

SUMMARY OF INVENTION

An object of the present invention is to provide a brushless motor stator that may be applied to a plurality of types of motors having different rotational speeds merely by providing one type of circuit substrate.

Another object of the present invention is to provide a brushless motor stator in which a hall element may be readily positioned relative to stator magnetic poles.

A brushless motor stator, of which improvement is aimed at by the present invention, comprises a stator core, a plurality of winding portions, a slot insulator made of an insulating resin, and a circuit substrate. The stator core includes a plurality of stator magnetic poles disposed at predetermined intervals around a center line. The center line coincides with a center of rotation of a rotor including a plurality of rotor magnetic poles formed of permanent magnets. The winding portions are formed by winging winding conductors around the stator magnetic poles. The slot insulator is attached to the stator core in order to electrically insulate the stator core and the winding portions. The circuit substrate includes at least one hall element that detects a positional relationship between the rotor magnetic poles and the stator magnetic poles and is positioned at one end portion of the slot insulator through a fitting position determining structure. The one end portion of the slot insulator where the circuit substrate is positioned is located in one direction where the center line extends. The fitting position determining structure is configured to change a mounting position of the circuit substrate relative to the stator magnetic poles to allow selection of the positional relationship between the at least one hall element and the stator magnetic poles from among a plurality of predetermined positional relationships of the at least one hall element relative to the stator magnetic poles. Specifically, the fitting position determining structure is configured to allow change of the positional relationship between the at least one hall element and the stator magnetic poles by shifting the circuit substrate by a certain angle around the center line in a circumferential direction of the stator at the time of positioning the at least one hall element relative to the stator magnetic poles. If the fitting position determining structure is configured as in the present invention, the mounting position of the circuit substrate relative to the stator core may be changed so that the positional relationship between the at least one hall element and the stator magnetic poles is suited to the speed range of a motor to be used without changing the configuration of the stator. Accordingly, it is not necessary to provide a plurality of types of circuit substrates having different arrangement positions of the hall element according to the speed range of the motor to be used, as it is in the conventional art. The stator may be applied to a plurality of types of motors having different rotational speed ranges, merely by providing the circuit substrate of one type. In the present invention, in particular, the at least one hall element may be readily positioned relative to the stator magnetic poles by fitting the circuit substrate and the slot insulator together.

The fitting position determining structure may include a plurality of fitting concave portions provided in the slot insulator and disposed along a virtual circle centering on the center line and at least one fitting convex portion provided on the circuit substrate. The at least one fitting convex portion is fitted in at least one of the fitting concave portions included in the plurality of fitting concave portions when the circuit substrate is shifted by a certain angle around the center line. The at least one fitting convex portion draws a locus along the virtual circle when the circuit substrate is shifted around the center line. With this, the position of the at least one hall element relative to the stator magnetic poles is determined by having at least one of the fitting convex portions fitted in at least one of the fitting concave portions selected from among the plurality of fitting concave portions disposed along the virtual circle. The plurality of fitting concave portions disposed along the virtual circle may readily be recognized visually. Thus, an appropriate one of the fitting concave portions may be readily selected. Since the at least one fitting convex portion may readily be recognized visually, the selected fitting concave portion may be readily fitted with the at least one fitting convex portion.

Such a fitting positioning structure may be constituted by forming at least one fitting convex portion on the slot insulator and forming a plurality of fitting concave portions in the circuit substrate. More specifically, the fitting position determining structure may include the at least one fitting convex portion provided on the slot insulator and disposed along a virtual circle centering on the center line and the plurality of fitting concave portions provided in the circuit substrate. The fitting concave portions are fitted with the at least one fitting convex portion when the circuit substrate is shifted by a certain angle around the center line.

The stator core of a fan motor or the like includes stator magnetic poles on an outer circumferential portion of an annular yoke. In a motor of outer rotor type mentioned above, namely, a motor having a rotor disposed outside the stator, a cylindrical portion extending in one direction is integrally provided at a central part of one end portion of the slot insulator, the one end portion being located in the one direction. Then, an annular portion having a smaller outer diameter than the cylindrical portion may be integrally and concentrically provided with the cylindrical portion at an end portion of the cylindrical portion in the one direction, and the fitting concave portions may be formed in the annular portion. The circuit substrate may be configured to have at a central portion thereof a through-hole in which an outer circumferential portion of the annular portion is fitted, and the at least one fitting convex portion may be integrally formed at an inner circumferential wall portion surrounding the through-hole. In the stator having the stator magnetic poles on the outer circumferential portion of the annular yoke in this manner, the annular yoke is disposed in a position close to the center line. If the cylindrical portion is integrally provided at a yoke covering portion of the slot insulator and the annular portion having the fitting concave portions formed therein is provided at the cylindrical portion, the fitting concave portions may be formed close to the center line of the slot insulator. The at least one fitting convex portion may be formed at the inner circumferential wall portion surrounding the through-hole at the central portion of the circuit substrate. Thus, the fitting concave portions and the at least one fitting convex portion may be readily formed.

Preferably, the at least one fitting convex portion may include a pair of the fitting convex portions facing each other. With this, the fitting convex portions and the fitting concave portions are fitted at two locations apart from each other. The fitting convex portions may be fitted in the fitting concave portions stably and tightly. The term "facing each other" used herein means that the pair of the fitting convex portions (separated apart by) 180° exactly face each other, or the pair of the fitting convex portions (separated apart by such an angle as 174° or) 186° face substantially each other. If the pair of the fitting convex portions are spaced apart by 186° or 174°, which means that the pair of the fitting convex portions does not exactly face each other but substantially face each other, it may prevent the pair of the fitting convex portions from being fitted in the pair of the fitting concave portions in wrong positions, in other words, the pair of the fitting convex portions are turned by 180° from their proper positions (in an inverted state).

In such a case as well, the at least one fitting convex portion may be formed on the slot insulator and the plurality of fitting concave portions may be formed in the circuit substrate.

Preferably, the cylindrical portion may have a contact surface that comes into contact with a hall element mounting surface, on which the at least one hall element is mounted, with the cylindrical portion being fitted in the through-hole. With this, when the selected fitting concave portion is fitted with the at least one fitting convex portion, the cylindrical portion of the slot insulator is fitted in the through-hole of the circuit substrate, and the hall element mounting surface of the circuit substrate comes into contact with the contact surface of the cylindrical portion. Thus, the circuit substrate may be securely mounted on the slot insulator.

A plurality of projecting portions which abut on the hall element mounting surface of the circuit substrate may be integrally provided at the one end portion of the slot insulator. Connecting pins connected to windings of the winding portions may be provided on at least some of the projecting portions. The projecting portions and the connecting pins extend in one direction where the center line extends. Then, a plurality of connecting-pin through-holes through which the connecting pins pass are formed in the circuit substrate. Connecting lands which are soldered to the connecting pins may be formed around the connecting-pin through-holes on a surface opposite to the hall element mounting surface of the circuit substrate. With this, the windings of the winding portions may be electrically connected to circuit patterns on the circuit substrate by passing the connecting pins through the connecting pin through-holes and soldering the connecting pins to the connecting lands. Here, combinations of the connecting pins and the connecting pin through-holes which the connecting pins pass through will differ depending upon which fitting convex portions are fitted with the selected fitting concave portion. However, if an angle by which the fitting concave portions are spaced apart is different from an angle by which the connecting pin through-holes are space apart, the connecting pins may be difficult to pass through the connecting pin through-holes, or the connecting pins cannot pass through the connecting pin through-holes. Preferably, the connecting pin through-holes are each shaped in an arc elongated hole or an elongated hole forming into an arc in the circumferential direction. With this, the connecting pins may pass through the connecting pin through-holes in appropriate positions. Accordingly, even if the angle between the fitting concave portions is different from the angle between the connecting pin through-holes, the connecting pins may pass through the connecting pin through-holes without being impaired.

According to the present invention, the fitting position determining structure used to mount the circuit substrate on the slot insulator is configured to allow selection of a positional relationship between at least one hall element and the stator magnetic poles from among the plurality of predetermined positional relationships of at least one hall element relative to the stator magnetic poles. Thus, according to the speed range of the motor to be used, the position of the at least one hall element relative to the stator magnetic poles may be appropriately selected. It is not necessary to provide a plurality of types of circuit substrates having different hall element arrangement positions, corresponding to the speed range of the motor to be used, as it is necessary in the conventional art. One circuit substrate may be applied to a plurality of types of motors having different rotational speed ranges, merely by providing the circuit substrate of one type.

BRIEF DESCRIPTION OF DRAWINGS

These and other objects and many of the attendant advantages of the present invention will be readily appreciated as the same becomes better understood by reference to the following detailed description when considered in connection with the accompanying drawings.

DESCRIPTION OF EMBODIMENTS

Figure 1:
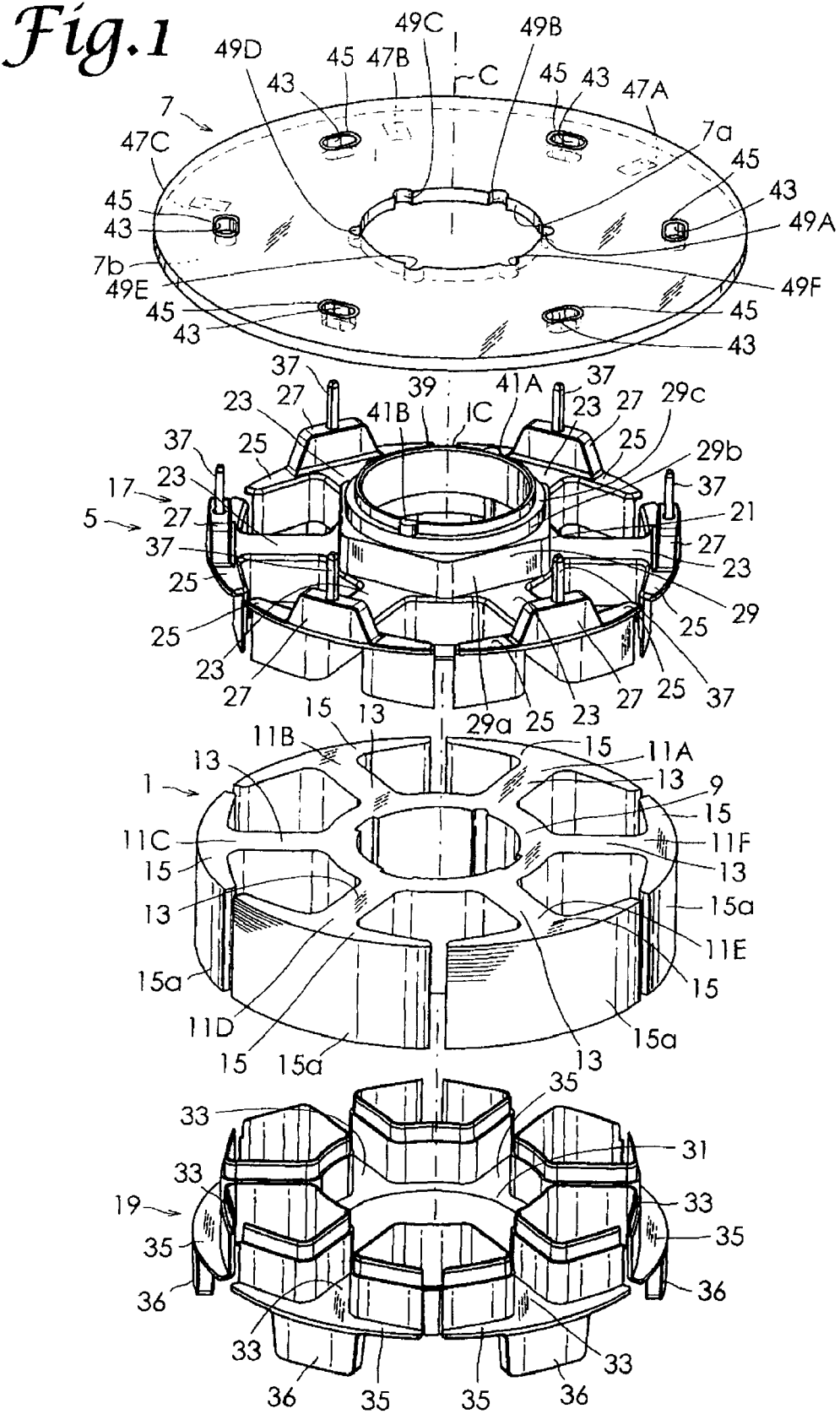
FIG. 1 is an exploded perspective view of a brushless motor stator in an embodiment of the present invention.
Figure 2:
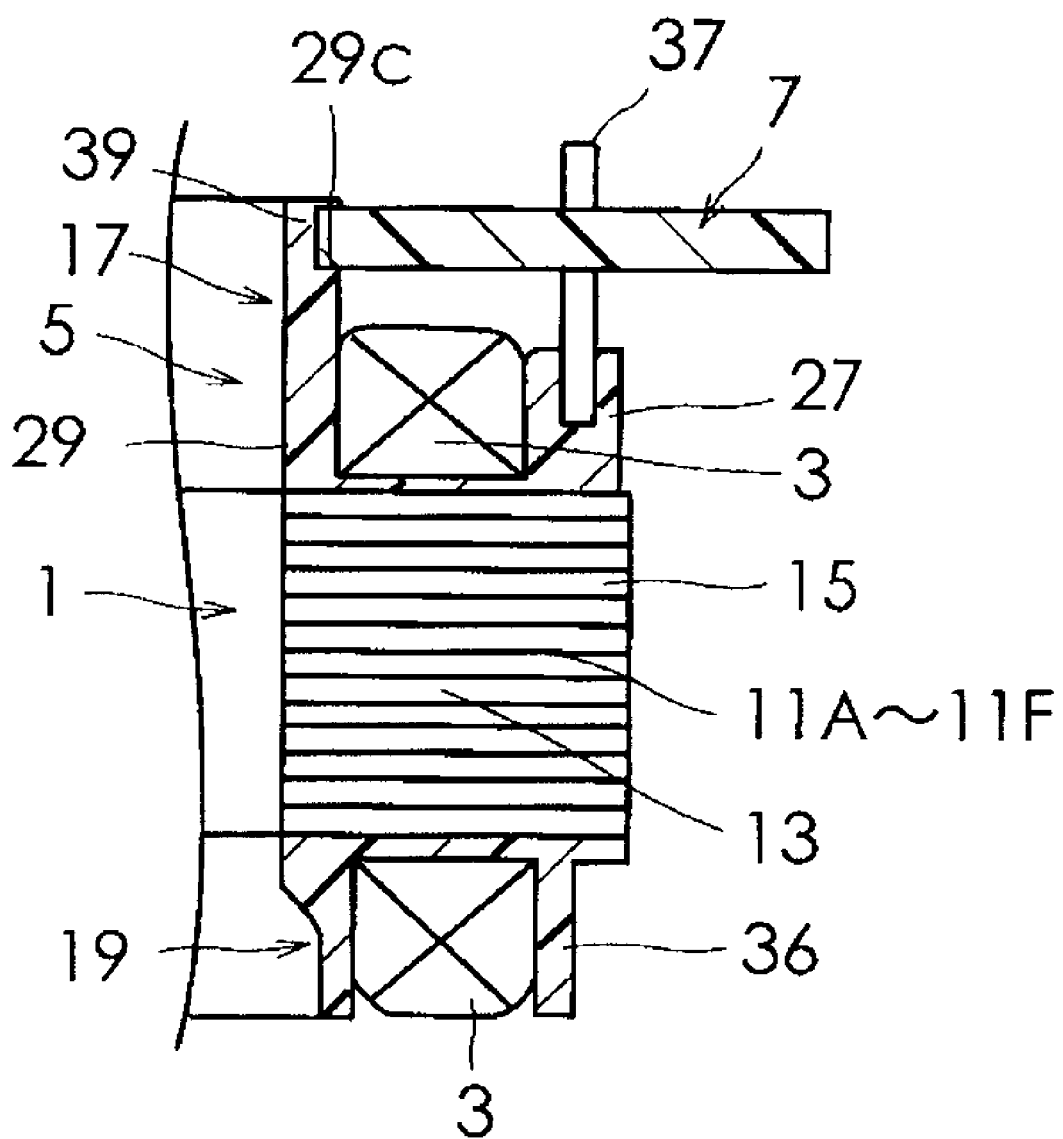
FIG. 2 is a sectional view showing a half portion of the brushless motor stator in the embodiment of the present invention.

Embodiments of the present invention will be described below in detail with reference to drawings. FIG. 1 is an exploded perspective view showing a brushless fan motor stator according to an embodiment of the present invention. FIG. 2 is a sectional view showing a half portion of the brushless motor stator. As shown in FIGS. 1 and 2, the brushless motor stator of this embodiment includes a stator core 1, six winding portions 3, a slot insulator 5, and a circuit substrate 7. For facilitating understanding, the winding portions 3 are omitted in FIG. 1, and are shown in FIG. 2 alone. The stator core 1 includes an annular yoke 9 and six stator magnetic poles 11A to 11F provided at an outer circumferential portion of the annular yoke 9. The six stator magnetic poles 11A to 11F are provided at predetermined intervals around a center line C that coincides with a center of rotation of a rotor not shown. The rotor includes a plurality of motor magnetic poles formed of a permanent magnet. Each of the stator magnetic poles 11A to 11F includes a pole post 13 coupled to the yoke 9 and a magnetic pole surface forming portion 15 provided at an end portion of the pole column 13. A magnetic pole surface 15a is formed on a radially outer side of the magnetic pole surface forming portion 15. Magnetic pole surfaces 15a face the rotor magnetic poles mounted on an inner circumferential surface of a cup-like member not shown. The stator core 1 is formed by laminating a plurality of magnetically permeable steel plates of the same shape in a direction where the center line C extends. The six winding portions 3 are formed by winding winding conductors around the pole columns 13 of the six stator magnetic poles 11A to 11F in the stator core 1 (as shown in FIG. 2). The slot insulator 5 made of an insulating resin is attached to the stator core 1 in order to electrically insulate the stator 1 and the winding portions 3. The slot insulator 5 is constituted from a pair of insulator divided bodies 17 and 19 which are fitted in the stator core 1 at axial ends of the stator core 1 in the direction where the center line C extends.

The insulator divided body 17, which is one of the pair of the insulator divided bodies 17 and 19, is formed in one piece of a synthetic resin. The insulator divided body 17 integrally includes a yoke covering portion 21 that covers a part of the yoke 9, six pole column covering portions 23 that are connected to the yoke covering portion 21 and cover the six pole columns 13, magnetic pole surface forming portion covering sections 25 that partially cover the six magnetic pole surface forming portions 15 so that the magnetic pole surfaces 15a are exposed, projecting portions 27 coupled to the magnetic pole surface forming portion covering sections 25, and a cylindrical portion 29 coupled to the yoke covering portion 21. The insulator divided body 19, which is the other of the insulator divided bodies 17 and 19, has basically the same structure as the insulator divided body 17 except that the insulator divided body 19 does not include the cylindrical portion 29. Specifically, the insulator divided body 19 is formed in one piece of the synthetic resin, and integrally includes a yoke covering portion 31, six magnetic pole column covering portions 33, magnetic pole surface forming portion covering sections 35, and projecting portions 36.

Each projecting portion 27 of the insulator divided body 17 has a shape of a plate, and projects toward the circuit substrate 7 from the magnetic pole surface forming portion covering section 25. Each projecting portion 27 abuts on the circuit substrate when the substrate is attached to the slot insulator. Connecting pins 37 connected to the windings of the six winding portions 3 are provided at the six projecting portions 27, projecting toward the circuit substrate 7. With the insulator divided body 17 attached to the stator core 1, the six connecting pins 37 are located in the middle of the six stator magnetic poles 11A to 11F in a circumferential direction of the stator.

The cylindrical portion 29 of the insulator divided body 17 includes a hexagonal cylindrical portion 29a and a circular cylindrical portion 29b centering on the center line C, and extends in one direction of the center line C from an end portion of the yoke covering portion 21. At an end portion of the cylindrical portion 29 in the one direction, an annular portion 39 is integrally provided with the cylindrical portion 29. The annular portion 39 has a shape of an annular ring centering on the center line C. The annular portion 39 has a smaller outer diameter than the cylindrical portion 29, and is provided concentric with the cylindrical portion 29. A pair of fitting convex portions 41A and 41B, which project radially outside of a virtual circle centering on the center line C, are formed at an outer circumferential portion of the annular portion 39. The pair of fitting convex portions 41A and 41B are disposed facing each other at positions slightly deviated from positions on a diagonal line of the annular portion 39. In this embodiment, an angle between the fitting convex portions 41A and 41B is) 174° (186°). Each of the pair of fitting convex portions 41A and 41B has a semicircular contour shape as seen from the one direction where the center line C extends.

Figure 3:
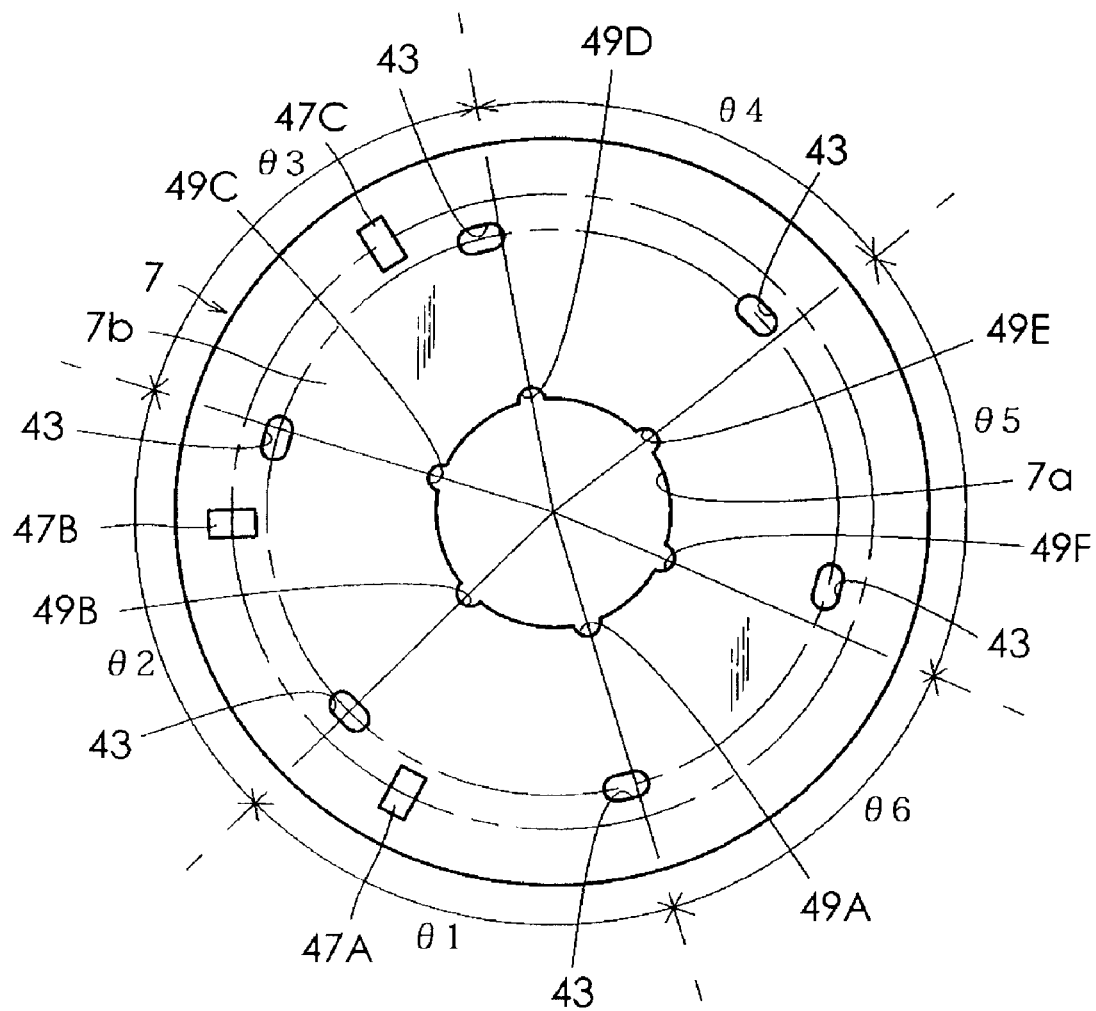
FIG. 3 is a back view of a circuit substrate of FIG. 1, as seen from a direction opposite to the direction of the view in FIG. 1.

As shown in FIGS. 1 and 3, the circuit substrate 7 has a shape of a circular plate and has a through-hole 7a at its central portion. FIG. 3 shows a hall element mounting surface 7b of the circuit substrate 7, as seen from the back side of the circuit substrate 7 shown in FIG. 1. Six connecting pin through-holes 43 through which the connecting pins 37 pass are formed in the circuit substrate 7 at equidistant intervals in the circumferential direction. Each of the six connecting pin through-holes 43 has an arc elongated shape that extends or is elongated in the circumferential direction. A solderable connecting land 45 connected to a predetermined circuit pattern not shown is formed around an opening portion of each connecting pin through-hole 43. The opening portion of each connecting pin through-hole 43 is located on a surface opposite to the hall element mounting surface 7b of the circuit substrate 7 (as shown in FIG. 1). Circuit patterns, on which circuit elements used for signal processing of hall elements and control of a motor current are mounted, are formed on both the hall element mounting surface and the opposite surface of the circuit substrate 7. Further, three hall elements 47A to 47C that are spaced in the circumferential direction are provided in the vicinity of a circumferential edge portion of the hall element mounting surface 7b of the circuit substrate 7. The three hall elements 47A to 47C are provided at positions in the vicinity of the rotor magnetic poles to detect relative positional relationships between the rotor magnetic poles and the stator magnetic poles 11A to 11F. The three hall elements 47A to 47C are spaced in the circumferential direction so that an angle between adjacent two of the three hall elements 47A to 47C centering on the center line C is 60°. Six fitting concave portions 49A to 49F are formed in an inner circumferential wall portion of the circuit substrate 7 that surrounds the through-hole 7a. In other words, the six fitting concave portions 49A to 49F are formed in the circuit substrate 7 to be fitted with the pair of fitting convex portions 41A and 41B when the circuit substrate 7 is shifted by a predetermined angle (shifted by 60° in the circumferential direction in this embodiment) around the center line. The six fitting concave portions 49A to 49F are three pairs of the fitting concave portions (49A, 49D), (49B, 49E), and (49C, 49F). One pair of the fitting concave portions (49A, 49D) are not located on a diagonal line, but are disposed to face each other, being spaced at an angle interval in the circumferential direction that allows the pair of fitting convex portions 41A and 41B to be fitted in the pair of the fitting concave portions (49A, 49D).

In this embodiment, the outer circumferential portion of the annular portion 39 of the insulator divided body 17 is fitted in the through-hole 7a of the circuit substrate 7. A surface (contact surface) 29c of the cylindrical portion 29 of the insulator divided body 17 exposed in the one direction comes into contact with the hall element mounting surface 7b of the circuit substrate 7, and the six connecting pins 37 are fitted in the six connecting pin through-holes 43. The circuit substrate 7 is thereby mounted on the insulator divided body 17. Then, the pair of fitting convex portions 41A and 41B of the insulator divided body 17 are fitted in one pair of the three pairs of the fitting concave portions (49A, 49D), (49B, 49E) and (49C, 49F). In this way, a positional relationship of the three hall elements 47A to 47C relative to the stator magnetic poles 11A to 11F is selected. In this embodiment, three positional relationships of the three hall elements 47A to 47C relative to the stator magnetic poles 11A to 11F are defined by combinations of the three pairs of the fitting concave portions and the pair of fitting convex portions. Accordingly, the pair of fitting convex portions should be fitted in one pair selected from the three pairs of fitting concave portions in order to select one of the three positional relationships. With this relationship selected, the connecting pins 37 are soldered to the connecting lands 45 around the connecting pin through-holes through which the connecting pins 37 have passed. According to fitting between the selected pair of the fitting concave portions (49A, 49D, for example) and the pair of fitting convex portions 41A and 41B, combination of the six connecting pin through-holes 43 and the six connecting pins 37 which pass therethrough will differ.

As shown in FIG. 3, in this embodiment, an angle θ1 between the fitting concave portion 49A and the fitting concave portion 49B centering on the center line C, an angle θ2 between the fitting concave portion 49B and the fitting concave portion 49C centering on the center line C, an angle θ3 between the fitting concave portion 49C and the fitting concave portion 49D centering on the center line C, an angle θ4 between the fitting concave portion 49D and the fitting concave portion 49E centering on the center line C, and an angle θ5 between the fitting concave portion 49E and the fitting concave portion 49F centering on the center line C are all 62°. An angle θ6 between the fitting concave portion 49F and the fitting concave portion 49A centering on the center line C is 50°. The three pairs of the fitting concave portions (49A, 49D), (49B, 49E), and (49C, 49F) has an angle interval (of 186° or 174°) that is not 180°. Further, as described above, the pair of fitting convex portions 41A and 41B that are fitted in one of the three pairs of the fitting concave portions (49A, 49D), (49B, 49E), and (49C, 49F) also have an angle interval (of 186° or 174°) that is not 180°. As a result, only one fitting convex portion 41A of the pair of fitting convex portions 41A and 41B is fitted into one fitting concave portion 49A, 49B, or 49C of the three pairs of the fitting concave portions (49A, 49D), (49B, 49E), and (49C, 49F), and the other fitting convex portion 41B, which should be fitted in one fitting concave portion (49D, 49E, or 49F), is not fitted into any of these fitting concave portions (49A, 49B, and 49C). Further, only the other fitting convex portion 41B of the pair of the fitting convex portions 41A and 41B is fitted into the other fitting concave portion 49D, 49E, or 49F of the three pairs of the fitting concave portions (49A, 49D), (49B, 49E), and (49C, 49F). The one fitting convex portion 41A, which should be fitted in one fitting concave portion (49A, 49B, or 49C), is not fitted into any of these fitting concave portions (49D, 49E, and 49F). Thus, three types of positional relationships shown in FIGS. 4A to 4C are selected as the positional relationships of the three hall elements 47A to 47C relative to the stator magnetic poles 11A to 11F, corresponding to the speed range of a motor to be used.

Figure 4A:
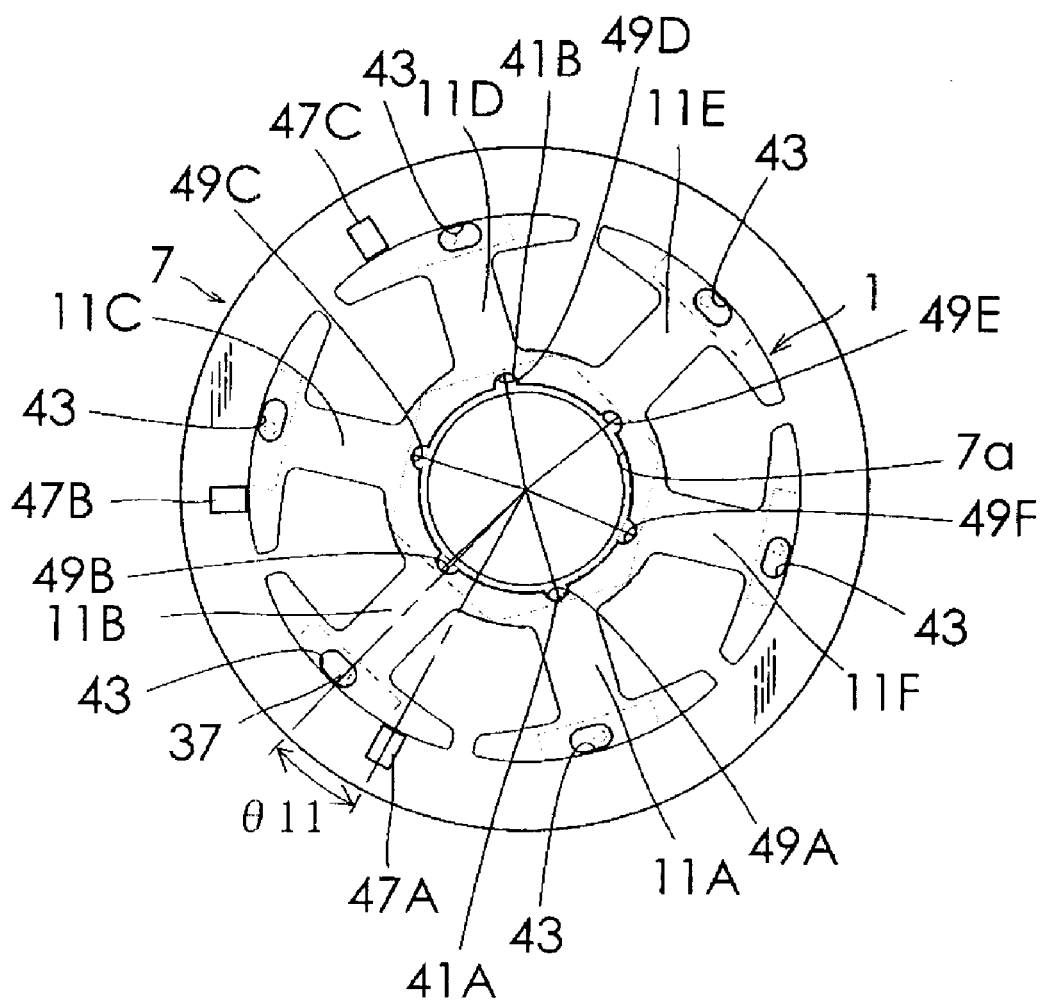
FIGS. 4A to 4C explain positional relationships of hall elements relative to stator magnetic poles corresponding to the speed range of a motor to be used.
Figure 4B:
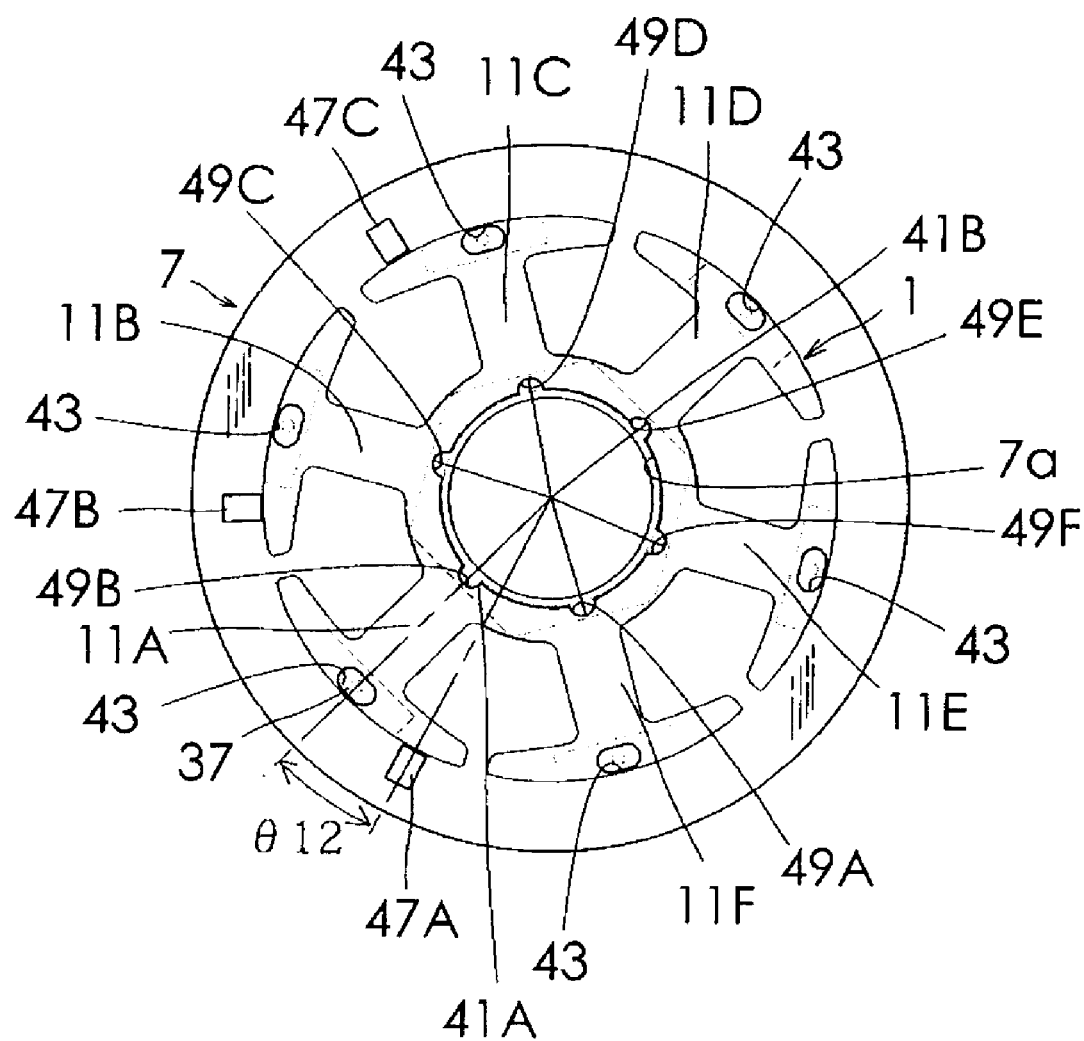
Figure 4C:
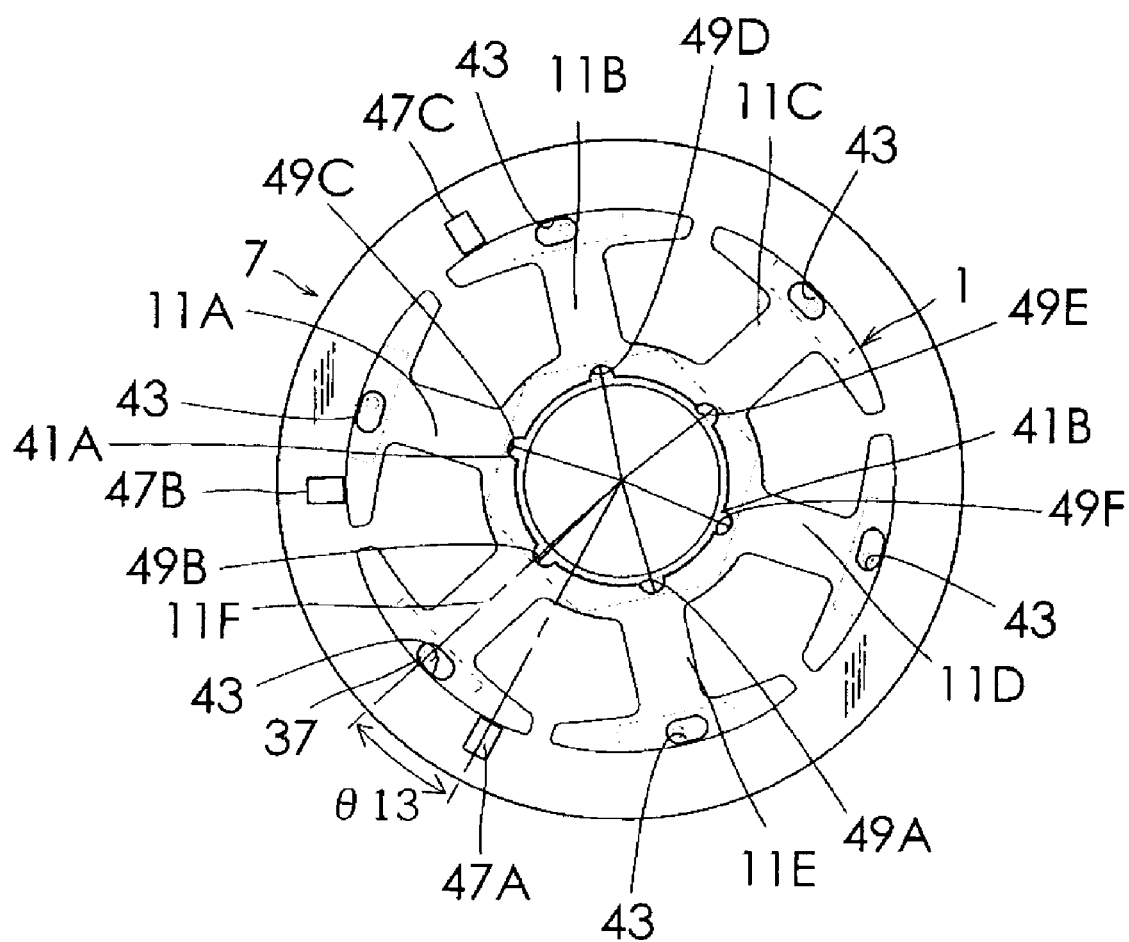

FIG. 4A shows an example of selected mounting position of the circuit substrate on the stator core when the motor to be used has a low speed. Referring to FIG. 4A, the pair of the fitting convex portions 41A and 41B are fitted in the pair of the fitting concave portions 49A and 49D. In this case, each of the connecting pins 37 is positioned at an end portion of the connecting pin through-hole 43 in an anticlockwise direction. The connecting pin through-hole 43, through which the pin passes, has the arc elongated shape. FIG. 4B shows an example of selected mounting position of the circuit substrate on the stator core when the motor to be used has an intermediate speed. The pair of the fitting convex portions 41A and 41B are fitted in the pair of the fitting concave portions 49B and 49E. In this case, each connecting pin 37 is positioned in the middle of the connecting pin through-hole 43 in the circumferential direction. FIG. 4C shows an example of selected mounting position of the circuit substrate on the stator core when the motor to be used has a high speed. The pair of the fitting convex portions 41A and 41B are fitted in the pair of the fitting concave portions 49C and 49F. In this case, each of the connecting pins 37 is positioned at an end portion of the connecting pin through-hole 43 in a clockwise direction. An angle θ11 shown in FIG. 4A, an angle θ12 shown in FIG. 4B, and an angle θ13 shown in FIG. 4C have a relationship of θ11<θ12<θ13 according to the positions of the connecting pins 37 in the connecting pin through-holes 43. The angle θ11 is formed between a central portion of the hall element 47A in the circumferential direction and a central portion of the stator magnetic pole 11B in proximity to the hall element 47A (or the connecting pin 37 corresponding to the stator magnetic pole 11B) in the circumferential direction. The angle θ12 is formed between the central portion of the hall element 47A in the circumferential direction and a central portion of the stator magnetic pole 11A in proximity to the hall element 47A (or the connecting pin 37 corresponding to the stator magnetic pole 11A) in the circumferential direction. The angle θ13 is formed between the central portion of the hall element 47A in the circumferential direction and a central portion of the stator magnetic pole 11F in proximity to the hall element 47A (or the connecting pin 37 corresponding to the stator magnetic pole 11F) in the circumferential direction.

In this embodiment, a fitting position determining structure comprises the three pairs of the fitting concave portions (49A, 49D), (49B, 49E), and (49C, 49F) of the circuit substrate 7 and the pair of the fitting convex portions 41A and 41B of the one insulator divided body 17. The fitting position determining structure allows selection of the positional relationship between the hall elements 47A to 47C and the stator magnetic poles 11A to 11F among a plurality (three in this embodiment) of the positional relationships by shifting the circuit substrate by a certain angle around the center line C in the circumferential direction at the time of positioning the hall elements relative to the stator magnetic poles. In other words, the fitting position determining structure comprises the pair of the fitting convex portions 41A and 41B that are provided on the one insulator divided body 17 and are arranged along a virtual circle IC (that coincides with an outer circumference of the annular portion 39 in FIG. 1) centering on the center line C and the three pairs of the fitting concave portions (49A, 49D), (49B, 49E), and (49C, 49F). Each pair of the fitting concave portions is fitted with the pair of the fitting convex portions 41A and 41B. The three pairs of the fitting concave portions (49A, 49D), (49B, 49E), and (49C, 49F) are provided in the circuit substrate 7 and draw a locus along the virtual circle IC when the circuit substrate 7 is shifted by the certain angle around the center line C at the time of positioning.

According to the brushless motor stator of this embodiment, positions of the hall elements 47A to 47C relative to the stator magnetic poles 11A to 11F may be appropriately determined, according to the speed range of the motor to be used, merely by mounting the circuit substrate 7 on the one insulator divided body 17 of the slot insulator 5 using the fitting position determining structure. According to this embodiment, only one type of circuit substrate 7 may be applied to a plurality of types of motors having different rotational speed ranges.

In this embodiment, the pair of the fitting convex portions 41A and 41B are formed on the one insulator divided body 17. Then, the three pairs of the fitting concave portions (49A, 49D), (49B, 49E), and (49C, 49F) are formed in the circuit substrate 7. The three pairs of the fitting concave portions may be formed in the one insulator divided body 17, and the pair of the fitting convex portions may be formed on the circuit substrate 7.

Figure 5:
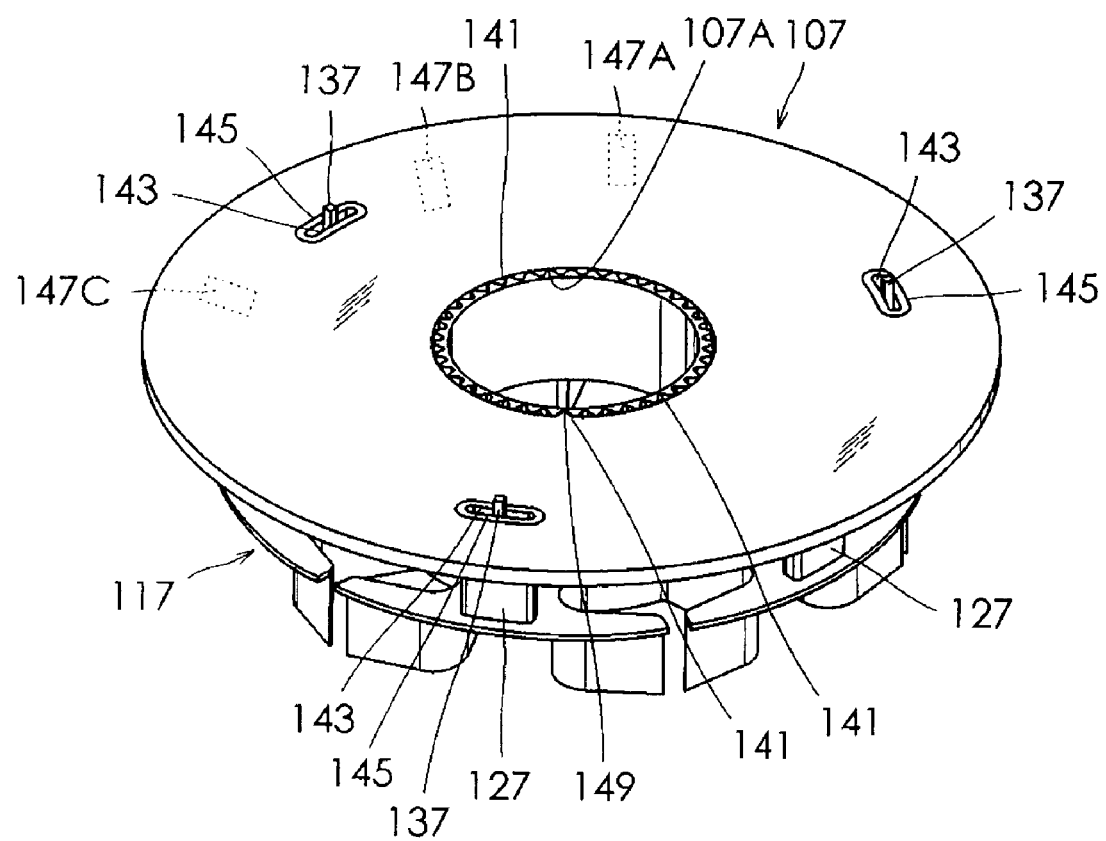
FIG. 5 is a perspective view showing a portion of a brushless motor stator in another embodiment of the present invention.
Figure 6:
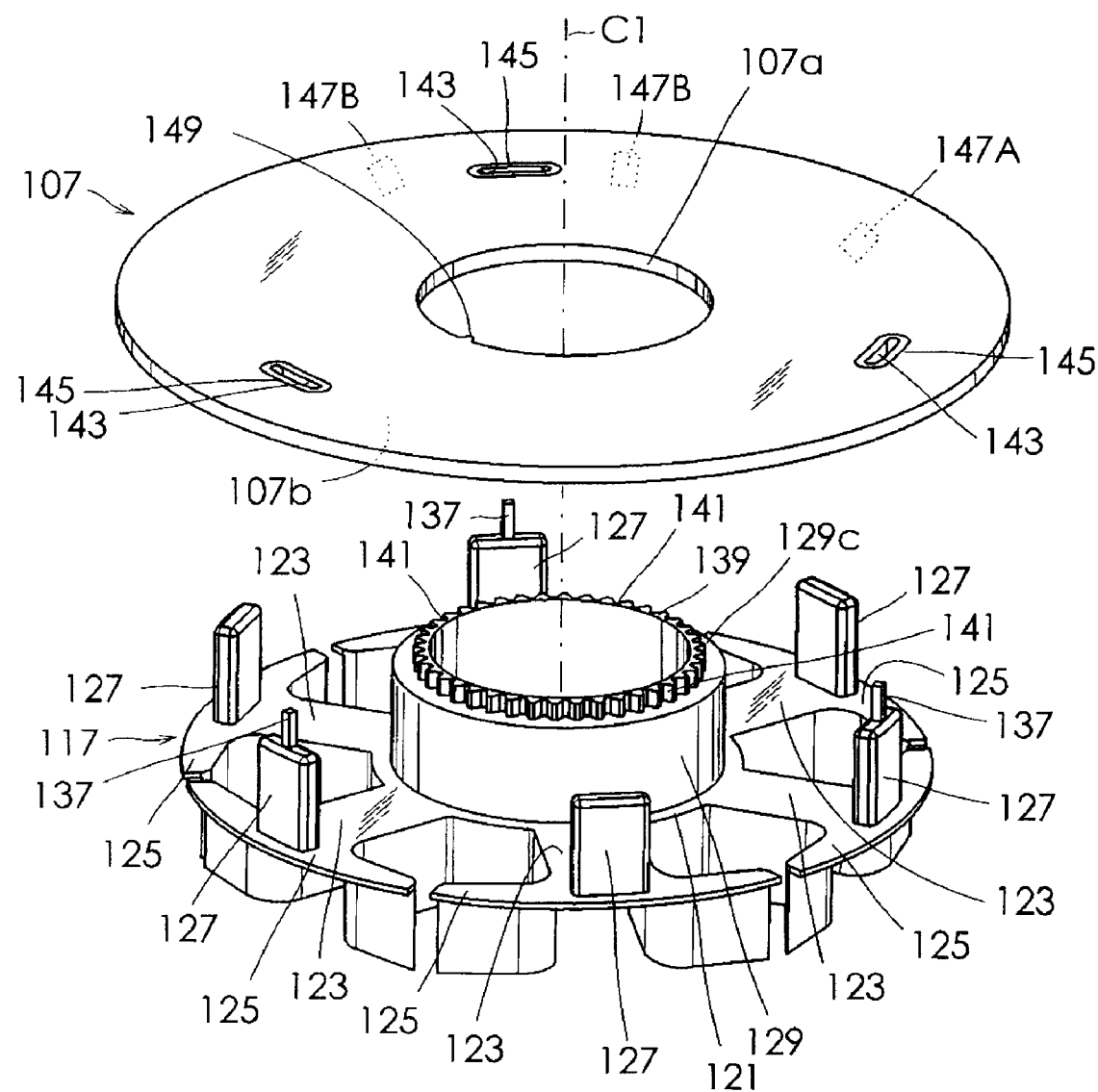
FIG. 6 is an exploded perspective view showing the portion of the brushless motor stator in the another embodiment of the present invention.

FIG. 5 is a perspective view showing a part of a brushless motor stator in another embodiment of the present invention. FIG. 6 is a perspective view partially showing the brushless motor stator. The brushless motor stator has the same structure as the stator shown in FIGS. 1 to 4 except a cylindrical portion and projecting portions of one insulator divided body 117 and a through-hole of a circuit substrate. In FIG. 5, a stator core, six winding portions, and the other insulator divided body are accordingly omitted. Reference numerals obtained by adding 100 to the reference numerals in FIGS. 1 to 4 are assigned to parts that are the same as those in FIGS. 1 to 4, and descriptions thereof will be omitted.

As shown in FIG. 6, the one insulator divided body 117 of the brushless motor stator in this embodiment is formed in one piece of a synthetic resin, and integrally includes a yoke covering portion 121, six pole column covering portions 123, magnetic pole surface forming portion covering sections 125, six projecting portions 127, and a cylindrical portion 129. Each projecting portion 127 has a rectangular parallelepiped shape. Connecting pins 137 connected to windings of the winding portions are provided at three every other ones of the six projecting portions 127 disposed in a circumferential direction of the stator.

The cylindrical portion 129 of the insulator divided body 117 has a circular-cylindrical shape and extends from an end portion of the yoke covering portion 121 in one direction in which a center line C1 extends. At an end portion of the cylindrical portion 129 in the one direction, an annular portion 139 is integrally provided with the cylindrical portion 129. The annular portion 139 has an annular ring shape centering on the center line C1. An outer diameter of the annular portion 139 is smaller than the cylindrical portion 129 and is provided concentric with the cylindrical portion 129. Forty or 40 fitting concave portions 141 are formed in an outer circumferential portion of the annular portion 139. The 40 fitting concave portions 141 are disposed at equidistant angle intervals of 9°.

Three connecting pin through-holes 143 are formed in a circuit substrate 107 at equidistant intervals in the circumferential direction. Each of the three connecting pin through-holes 143 has an arc elongated shape that extends or is elongated in the circumferential direction. A solderable connecting land 145 connected to a predetermined circuit pattern is formed around a connecting pin through-hole 143 on a surface opposite to a hall element mounting surface 107b of the circuit substrate 107. One fitting convex portion 149 is formed at an inner circumferential wall portion of the circuit substrate 107 surrounding a through-hole 107a. In this embodiment, the outer circumferential portion of the annular portion 139 of the insulator divided body 117 is fitted into the through-hole 107a of the circuit substrate 107, and a surface (contact surface) 129c of the cylindrical portion 129 of the insulator divided body 117 that is exposed in the one direction comes into contact with the hall element mounting surface 107b of the circuit substrate 107. The circuit substrate 107 is thereby mounted on the insulator divided body 117. As shown in FIG. 5, the fitting convex portion 149 of the circuit substrate 107 is fitted in one of the 40 fitting concave portions 141. In this way, a positional relationship between the hall elements 147A to 147C and stator magnetic poles is selected. With the positional relationship selected, the connecting pins 137 are soldered to the connecting lands 145 around the connecting pin through-holes 143 through which the connecting pins 137 have passed.

According to the brushless motor stator of this embodiment, positions of the hall elements 147A to 147C relative to the stator magnetic poles may be selected from a lot of positional relationships defined by combinations of the 40 fitting concave portions 141 and the fitting convex portion 149, according to the speed range of a motor to be used.

In this embodiment, the 40 fitting concave portions 141 are formed in the insulator divided body 117. One fitting convex portion 149 is formed on the circuit substrate 107. One fitting convex portion, however, may be formed on the insulator divided body 117, and the 40 fitting concave portions may be formed in the circuit substrate 107.

Either of the embodiments shows an example where the present invention has been applied to the brushless motor stator of outer rotor type where the rotor is disposed outside the stator) comprising the stator magnetic poles at the outer circumferential portion of the annular yoke. The present invention may be of course applied to a brushless motor stator (of inner rotor type where the rotor is disposed inside the stator) comprising a plurality of stator magnetic poles at an inner circumferential portion of an annular yoke.

While the preferred embodiments of the invention have been described with a certain degree of particularity with reference to the drawings, obvious modifications and variations are possible in light of the above teachings. It is therefore to be understood that within the scope of the appended claims, the invention may be practiced other than as specifically described.

What is claimed is:

1. A brushless motor stator comprising:
    a stator core including a plurality of stator magnetic poles disposed at predetermined intervals around a center line that coincides with a center of rotation of a rotor including a plurality of rotor magnetic poles formed of permanent magnets;
    a plurality of winding portions formed by winding winding conductors around the stator magnetic poles;
    a slot insulator made of an insulating resin and attached to the stator core in order to electrically insulate the stator core and the winding portions; and
    a circuit substrate including at least one hall element that detects a positional relationship between the rotor magnetic poles and the stator magnetic poles, and positioned at one end portion of the slot insulator through a fitting position determining structure, the one end portion of the slot insulator being located in one direction where the center line extends, wherein the fitting position determining structure comprises:
   a plurality of fitting concave portions provided in the slot insulator and disposed along a virtual circle centering on the center line; and
   at least one fitting convex portion provided on the circuit substrate, the at least one fitting convex portion being fitted in at least one of the fitting concave portions included in the plurality of fitting concave portions when the circuit substrate is shifted by a certain angle around the center line;
the fitting position determining structure is configured to change a mounting position of the circuit substrate relative to the stator magnetic poles to allow selection of the positional relationship between the at least one hall element and the stator magnetic poles from among a plurality of predetermined positional relationships of the at least one hall element relative to the stator magnetic poles;
the stator core includes the stator magnetic poles on an outer circumferential portion of an annular yoke;
a cylindrical portion extending in the one direction is integrally provided at a central portion of the one end portion of the slot insulator;
an annular portion having a smaller outer diameter than the cylindrical portion is integrally and concentrically provided with the cylindrical portion at an end portion of the cylindrical portion in the one direction;
the fitting concave portions are formed in the annular portion; and
the circuit substrate has at a central portion thereof a through-hole in which an outer circumferential portion of the annular portion is fitted, and the at least one fitting convex portion is integrally formed at an inner circumferential wall portion surrounding the through-hole.

2. The brushless motor stator according to claim 1, wherein the at least one fitting convex portion includes a pair of the fitting convex portions facing each other.

3. A brushless motor stator comprising:
a stator core including a plurality of stator magnetic poles disposed at predetermined intervals around a center line that coincides with a center of rotation of a rotor including a plurality of rotor magnetic poles formed of permanent magnets;
a plurality of winding portions formed by winding winding conductors around the stator magnetic poles;
a slot insulator made of an insulating resin and attached to the stator core in order to electrically insulate the stator core and the winding portions; and
a circuit substrate including at least one hall element that detects a positional relationship between the rotor magnetic poles and the stator magnetic poles, and positioned at one end portion of the slot insulator through a fitting position determining structure, the one end portion of the slot insulator being located in one direction where the center line extends, wherein
the fitting position determining structure comprises:
   at least one fitting convex portion provided on the slot insulator and disposed along a virtual circle centering on the center line; and
   a plurality of fitting concave portions provided in the circuit substrate, the fitting concave portions being fitted with the at least one fitting convex portion when the circuit substrate is shifted by a certain angle around the center line;
the fitting position determining structure is configured to change a mounting position of the circuit substrate relative to the stator magnetic poles to allow selection of the positional relationship between the at least one hall element and the stator magnetic poles from among a plurality of predetermined positional relationships of the at least one hall element relative to the stator magnetic poles;
the stator core includes the stator magnetic poles on an outer circumferential portion of an annular yoke;
a cylindrical portion extending in the one direction is integrally provided at a central portion of the one end portion of the slot insulator;
an annular portion having a smaller outer diameter than the cylindrical portion is concentrically and integrally provided with the cylindrical portion at an end of the cylindrical portion in the one direction;
the at least one fitting convex portion is formed on an outer circumferential portion of the annular portion; and
the circuit substrate has at a central portion thereof a through-hole in which the outer circumferential portion of the annular portion is fitted, and the fitting concave portions are formed in an inner circumferential wall portion surrounding the through-hole.

4. The brushless motor stator according to claim 3, wherein the at least one fitting convex portion includes a pair of the fitting convex portions facing each other.

5. The brushless motor stator according to claim 1, wherein the cylindrical portion has a contact surface that comes into contact with a hall element mounting surface, on which the at least one hall element is mounted, with the cylindrical portion being fitted in the through-hole.

6. The brushless motor stator according to claim 5, wherein
a plurality of projecting portions which abut on the hall element mounting surface of the circuit substrate are integrally provided at the one end portion of the slot insulator;
connecting pins connected to windings of the winding portions are provided on at least some of the projecting portions;
a plurality of connecting-pin through-holes through which the connecting pins pass are formed in the circuit substrate;
connecting lands which are soldered to the connecting pins are formed around the connecting-pin through-holes on a surface opposite to the hall element mounting surface of the circuit substrate; and
the connecting pin through-holes are each shaped in an arc elongated hole extending in the circumferential direction.

7. The brushless motor stator according to claim 3, wherein the cylindrical portion has a contact surface that comes into contact with a hall element mounting surface, on which the at least one hall element is mounted, with the cylindrical portion being fitted in the through-hole.

8. The brushless motor stator according to claim 7, wherein
a plurality of projecting portions which abut on the hall element mounting surface of the circuit substrate are integrally provided at the one end portion of the slot insulator;
connecting pins connected to windings of the winding portions are provided on at least some of the projecting portions;
a plurality of connecting-pin through-holes through which the connecting pins pass are formed in the circuit substrate;
connecting lands which are soldered to the connecting pins are formed around the connecting-pin through-holes on a surface opposite to the hall element mounting surface of the circuit substrate; and
the connecting pin through-holes are each shaped in an arc elongated hole extending in the circumferential direction.

* * * * *